Figure 1:
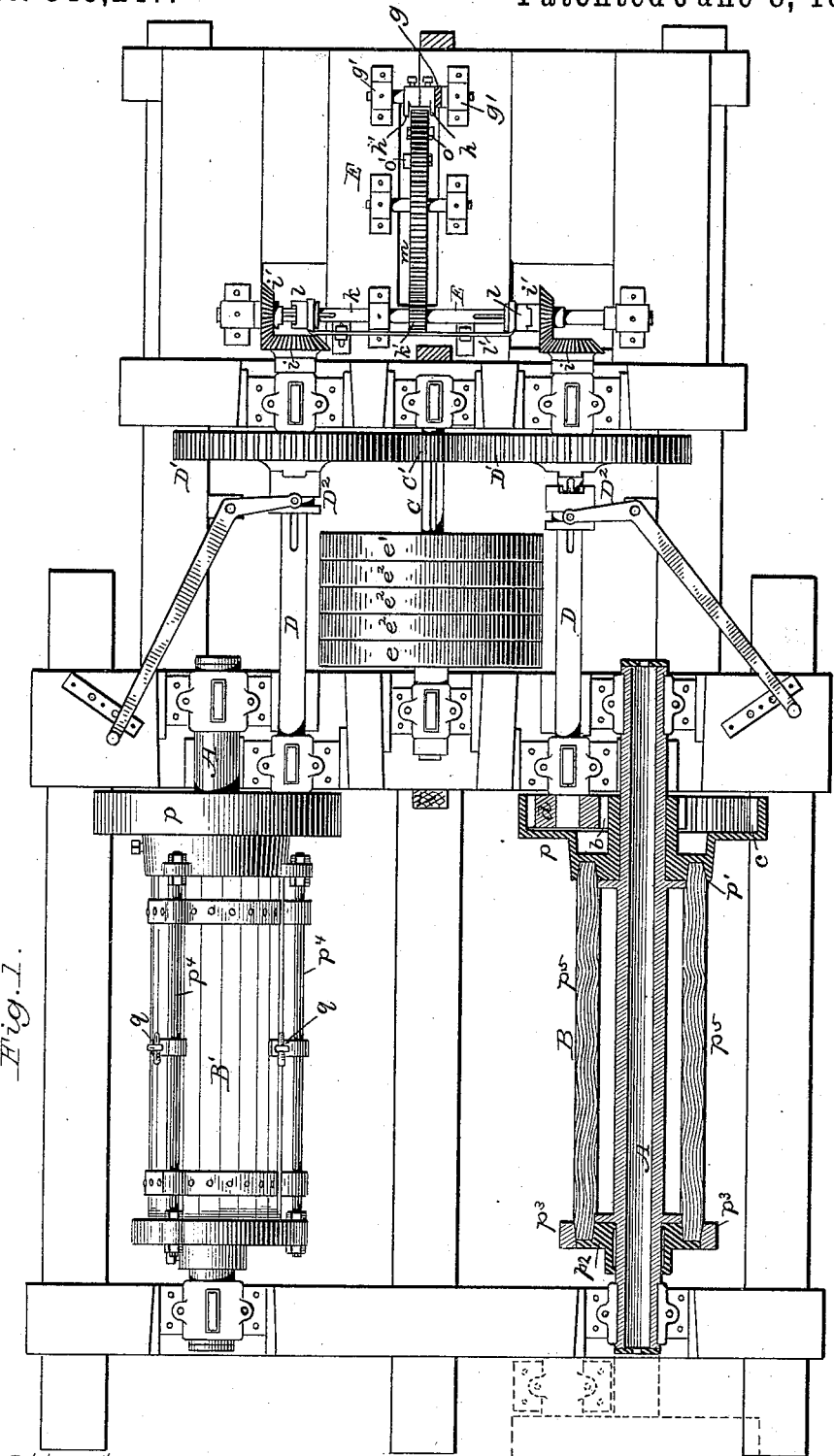

(No Model.) 2 Sheets—Sheet 1.

E. B LIGHT.
MACHINE FOR WORKING HIDES.

No. 343,247. Patented June 8, 1886.

Attest:
Philip F. Larner.
Howell T. Bartle.

Inventor:
Edward B. Light,
By M. C. Moor
Attorney.

(No Model.) 2 Sheets—Sheet 2.

E. B LIGHT.
MACHINE FOR WORKING HIDES.

No. 343,247. Patented June 8, 1886.

Attest:
Philip F. Larner
Howell Bartl

Inventor:
Edward B. Light,
By [signature]
Attorney.

UNITED STATES PATENT OFFICE.

EDWARD B. LIGHT, OF DENVER, COLORADO.

MACHINE FOR WORKING HIDES.

SPECIFICATION forming part of Letters Patent No. 343,247, dated June 8, 1886.

Application filed December 2, 1885. Serial No. 184,481. (No model.)

*To all whom it may concern:*

Be it known that I, EDWARD B. LIGHT, of Denver, in the county of Arapahoe and State of Colorado, have invented certain new and useful Improvements in Machines for Working Hides; and I do hereby declare that the following specification, taken in connection with the drawings furnished and forming a part of the same, is a clear, true, and complete description of my invention.

My said improvements relate to that well-known variety of machines which render raw-hides soft and pliable as a result of successive coiling and uncoiling a hide upon and from a shaft within a cage or drum, and thus "breaking" or "boarding" it, and during or after this operation the hide, if desired, may be "stuffed" or "filled" with suitable material for that purpose by putting the latter into the drum with the hide. So far as my knowledge extends, such machines have heretofore embodied a cage or drum which is stationary and an inclosed revolving shaft provided with means for clamping one end of one or more hides thereto.

The main object of my invention is to increase the working capacity of any one clamp-shaft and its cage or its drum, as the case may be, whether employed in breaking or stuffing as separate operations, or in both as a single or complex operation.

For accomplishing my purpose, I have for the first time, as I believe, devised a machine in which the inclosing cage or drum is mounted axially, so that it can be made to revolve while the clamp-shaft also revolves, thus enabling the cage or the drum, as the case may be, to actively operate upon the portion of a hide most remote from the clamp-shaft, and said cage or drum therefore actively co-operates with said shaft, instead of being a merely passive inclosing structure, as in all prior machines of this class known to me. The device or structure which incloses the clamping-shaft has usually been in the form of a cage having a series of bars or rods parallel with the shaft; but in some cases said device has been in the form of a trough, and in my machine said device may be either an open, skeletonized, or cage-like drum, or a closed drum, without departure from the main features of my invention. As in prior machines of this general class, I have provided for reversing the rotation of the clamping-shaft at regular intervals; but I employ certain reversing mechanism which is novel in that connection, and have also for the first time provided for reversing the rotation of the device or structure which incloses said clamping-shaft. I have also organized gearing for revolving two or more clamping-shafts and their cages or drums, and a reversing mechanism whereby said gearing may be coupled with or disconnected from each of said shafts and cages, and also coupled to or disconnected from said reversing mechanism, thus enabling said reversing mechanism to be operated so as to control any one or more of said shafts and their drums or cages.

After fully describing my invention as embodied in the machine illustrated the several features thereof will be specified in the several clauses of claim hereunto annexed.

Figure 2:
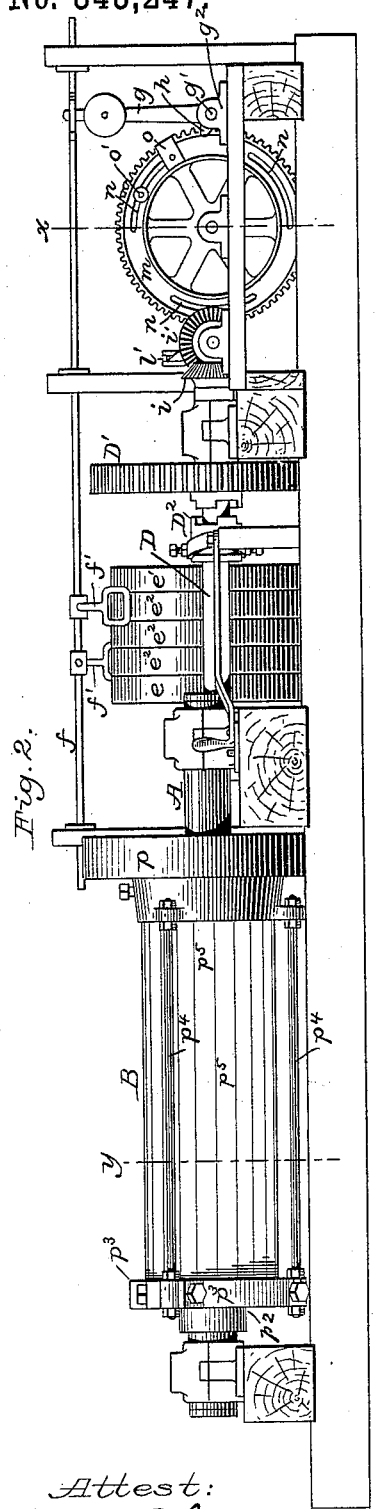
Figure 5:
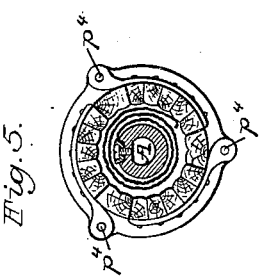
Figure 3:
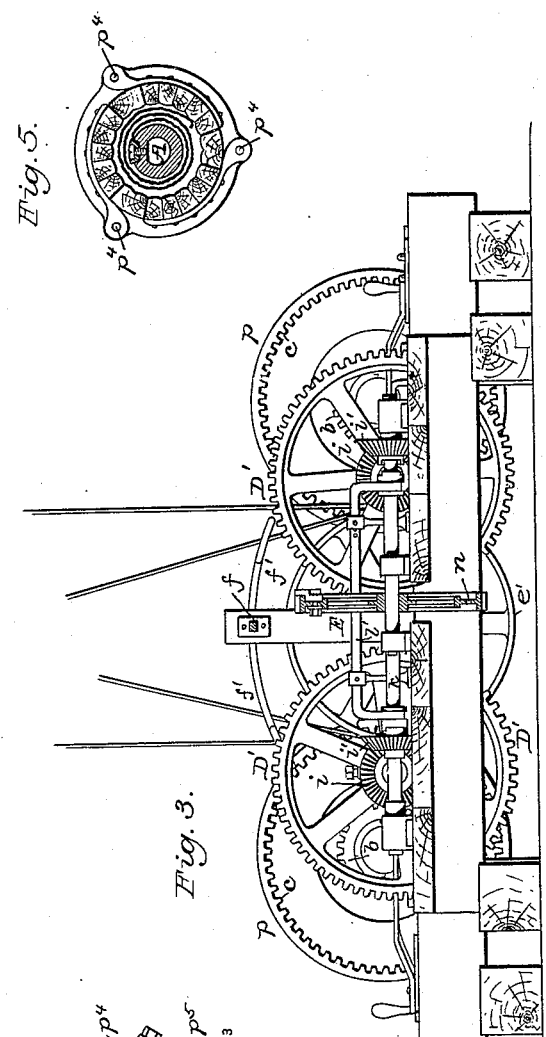
Figure 4:
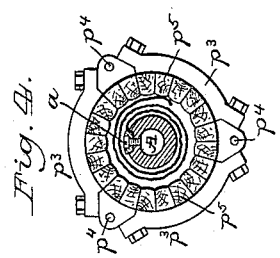

Referring to the drawings, Figure 1 is a partial plan and horizontal section of one of my machines. Fig. 2 is a side elevation of the same. Fig. 3 is an end view of the same, but with a portion thereof in vertical section through line $x$, Fig. 2. Fig. 4 is a section of one of the clamping-shafts and its cage or drum on line $y$, Fig. 2. Fig. 5 is a view similar to Fig. 4, but illustrating the drum constructed in hinged sections.

The operative or effective portions of the machine shown consist of a clamp-shaft, A, and a cage or drum, B. The shaft A is essentially provided with clamps $a$ of some kind, and, as shown, is substantially as heretofore, and only differs therefrom in that it is hollow and steam-tight to enable the introduction of steam thereto for warming the hides whenever that may be deemed desirable, steam-pipes with journaled joints being connected with the ends of said shaft in a manner well known. The rotary cage or drum B incloses the working portion of the clamping-shaft A, and is radically novel in that, instead of being stationary, as always heretofore, it is rotatively mounted, so that it can be made to revolve while the clamp-shaft is also revolving. Whether this drum be revolved in the same direction as the shaft at different speed or in the opposite direction at the same or different speed, said cage will co-operate actively with the clamp-shaft in working a hide, instead of passively, as always heretofore, and as the hide is clamped to said shaft the latter will wind the hide or hides thereon, as shown in Fig. 4, and also unwind the same, substantially as when the cage or drum is stationary; but for the first time the portions of the hide remote from said shaft will be positively acted upon by the cage itself, and more especially at such times as the shaft can impart no movement to the outer portion or end of the hide. I prefer, however, for obtaining the best results, to revolve the cage or drum oppositely to the shaft, and at a slower speed. One, two, or more cages or drums may be employed without departure from my invention, and although but two drums are shown complete others are indicated in dotted lines.

The particular variety of gearing or the mode of driving the clamp-shafts and their drums is immaterial under the main feature of my invention—as, for instance, the drum has at one head a smooth periphery, whereby it may be driven by means of a belt, and the clamp-shaft at either end may have a pulley for engagement by a second belt; but I prefer a system of gearing whereby one or several drums and shafts may be driven from one belt-pulley shaft.

It will be obvious that the bed or framing of the machine should be varied according to the system of gearing desired and the number of drums and shafts employed. As here shown, said bed affords bearings for the two clamp-shafts A, the driving-pulley shaft C, two short parallel shafts, D, and for the several parts of the reversing mechanism E. Each shaft A has a pinion, $b$, and each drum or cage an internal gear, $c$, and these in each case mesh with a gear, $d$, on the short shaft D, which is driven by a large loose gear, $D'$, which meshes with the small tight gear $C'$ on the pulley-shaft. Each shaft D has a clutch, $D^2$, by which the loose gear $D'$ may be rotatively coupled to or uncoupled from its shaft. As thus far described it will be obvious that either or both of said drums and their clamping-shafts can be put into operation or left idle, and that each clamping-shaft will be rotated oppositely to the drum and at a higher rate of speed. The pulley-shaft C is provided with two tight pulleys, $e$ and $e'$, and intermediate loose pulleys, $e^2$, so that by means of well-known crossed and straight belts respectively and alternately applied to the two tight pulleys the rotation of the clamping-shafts and the drums will be readily reversed.

Under the main feature of my invention it is, as before stated, immaterial how the drums and the clamping-shafts may be driven, and hence it is immaterial in that connection whether their reversal of rotation be controlled by hand or automatically, as by any well-known automatic reversing mechanism; but I have devised and make claim to the specific reversing mechanism in the combination shown. The sliding shipper-rod $f$ has near the belt-pulleys two arms, $f'$, each provided with a loop, through which one of the belts passes on its way to the pulleys, and said rod and its belt-loops are arranged in the usual manner, so that when either belt is on its tight pulley the other belt will be running free on one of the loose pulleys. Said shipper-rod is mounted in suitable guides, and near its rear end it has a slot occupied loosely by a vertical weighted lever, $g$, which is pivoted at its lower end by being mounted rigidly upon a rock-shaft, $g'$, having bearings $g^2$. On said rock-shaft are two arms, $h$ and $h'$, secured by screws, and rendered rotatively adjustable upon said shaft and with relation to each other. Said weighted lever is intermittingly thrown to and fro and the shipper-rod $f$ consequently reciprocated by means of gearing from the short shafts D, each of which at one end has a tight beveled gear, $i$, and each of these meshes with a similar gear, $i'$, loosely mounted on a shaft, $k$, but provided with clutch-faces for engagement with two splined sliding clutches, $l$, which are coupled by a rod or link, $l'$, so that either of said clutches may be locked with its respective clutch-face and always leave the other disengaged. At the middle of said shaft $k$ there is a small tight pinion, $k'$, which meshes with a large tappet-wheel gear, $m$, which is thereby slowly revolved during the ordinary operations of the machine. This tappet-wheel gear has within its rim one or segmental or curved slots, $n$, for the reception of clamping-bolts, by which the two tappets $o$ $o'$ are secured to said gear, one on each side thereof, and these are rendered readily adjustable with relation to each other because of the slots and clamping-bolts. These tappets respectively engage with the arms $h$ and $h'$ on the weighted lever rock-shaft, and cause said lever to be thrown toward or from the tappet-wheel, according to the direction in which said wheel is driven. With this reversing mechanism the two drums and clamping-shafts may be driven while the said mechanism remains idle, because both of the two clutches $l$ may be wholly disengaged from the clutch-faces. Either drum may be idle and the other active, and the reversing mechanism be nevertheless relied upon for operating with the active drum. The number of rotations of the drums between each reversal operation can be widely varied by varying the position of the tappets on their gear-wheels. The action of the tappets on the weighted lever is prompt, positive, and reliable, and the shipper-rod can be readily set so as to place both belts in loose pulleys.

I will now more particularly describe the drums and the clamping-shafts with reference to their particular construction and arrangement, and in this latter connection it is to be understood that, although they are shown in horizontal positions, I do not limit myself thereto, it being common to have them vertical, and it being obvious that any variation in their position will involve only well-known variations in gearing—as, for instance, the internal gear, clamp-shaft pinion, and the driving-gear meshing with both would be as shown, but said driving-gear, instead of being on a shaft, D, would be on a short vertical shaft, which would be coupled to said shaft D by means of beveled gears. The rotary drums B and B' differ somewhat in construction. The drum B has a head, $p$, before referred to as having a smooth periphery, and an internal gear, $c$, and this head is journaled on the clamping-shaft and confined to its bearing thereon by means of a flange on said shaft. This head, at its inner side, is annularly recessed at $p'$. At the opposite end another head, $p^2$, is similarly journaled and similarly recessed, although this latter recess is here rendered accessible by means of several segmental rim-pieces, $p^3$, provided with clamping-bolts for securing them to the head. These heads are rigidly coupled together by three longitudinal rods or bolts, $p^4$. A series of readily-displaced bars or staves, $p^5$, are each fitted at their ends to snugly occupy the annular recess $p'$ in the head $p$, and to be clamped at their opposite ends by the rim-pieces, thus forming either a tight drum or an open drum, if desired, or by leaving out alternate staves a cage will be afforded. I prefer to use wooden staves or sections, but other material may be employed. They should, however, for obtaining the best results, be so formed at their inner surfaces as to afford a corrugated interior for the drum, thus enabling it to engage with one or more hides with greater effective friction than would be the case if the drum had a smooth interior surface. The detachable rim-pieces enable the ready removal of a sufficient number of bars or sections for affording access to the interior while putting hides thereon and removing them. When the staves of the drum are composed of hard or even soft wood, and are thus confined only at the ends, each stave is more or less resilient or springy, and therefore they operate with more or less yielding contact with the hides, and enable them to spring outwardly under such undue internal pressure of the hides as is sometimes liable to occur while they are being worked.

In charging the drums (these latter being at rest and open at one side) one or more hides are clamped (either at their necks or a hind leg) to the shaft. Sometimes the clamped hides can be laid directly into the drum while the latter is at rest, but the drum and shaft are usually put in motion for causing the hides to be coiled within the drum, after which the drum and shaft are stopped for closing the drum preparatory to the working operation. The drum B' has a few of its bars permanently fixed by the heads, so as to afford intervening spaces occupied by sections which are hinged to the rods $p^4$, and are provided with locking-hasps $q$, also on said rods, for enabling ready access to the interior of the drum.

The employment of additional drums and clamping-shafts can obviously be readily provided for without departure from my invention—as, for instance, as shown in dotted lines, either clamp-shaft at its outer end may be extended and provided with a pinion corresponding to either pinion $d$ on a shaft, D, and engaging with another internal gear and clamp-shaft in precisely the same manner. In such an arrangement but one of said two drums thus coupled could be idle while the other was active, and therefore the added drums could not be separately coupled with the reversing mechanism. Additional drums and clamp-shafts may, however, be placed parallel with the drums B and B', and provided with similar shafts, D, and gears D', these latter being geared together, or through an intermediate idler, it being obvious, inasmuch as each shaft D is clutched to its gear D', that any number of drums arranged side by side and driven by continuous chains of gearing from the belt-pulley shaft can be controlled by the precise reversing mechanism shown, and that any one of said drums can be driven and properly reversed while all the others are idle, the only change then required being that the beveled gears $i$ would be rotatively coupled by a sleeve to the gears D', instead of being tight on the shafts D, as when but two drums and shafts are coupled to one reversing mechanism. The addition, as described, of one or more sets of drums and clamp-shafts to my machine would involve no more than a mere duplication of portions of the mechanism, coupled with such variations in mechanical details as would be promptly obvious to any skilled machinist. It will be seen that the flanges or collars on the clamp-shaft, before referred to, will prevent the passage of black grease from the bearings into the drums, thus preventing light-colored hides from being discolored.

Having thus described my invention, I claim as new and desire to secure by Letters Patent—

1. In a hide-working machine, the combination, substantially as hereinbefore described, of a rotary shaft provided with clamps by which hides can be attached thereto, and a rotary cage or drum which incloses said shaft, whereby said cage or drum is caused to actively co-operate with said shaft in working hides.

2. The combination, substantially as hereinbefore described, of the rotary clamp-shaft, the rotary cage or drum, and gearing for driving said shaft and drum at unequal speeds.

3. The combination, substantially as hereinbefore described, of the rotary clamp-shaft, the rotary inclosing-cage, and gearing for driving them in opposite directions.

4. The combination of the clamp-shaft having a pinion thereon, an inclosing-drum having an internal gear at one end thereof, and a shaft having a gear which engages with said pinion and gear and oppositely drives said shaft and drum, substantially as described.

5. The combination, substantially as hereinbefore described, of the oppositely-rotative clamping-shafts and drums, and reversing mechanism by which the said shafts and drums are simultaneously reversed in their rotation.

6. The combination, with one or more cages or drums and their clamping-shafts, of a driving-shaft provided with fast and loose belt-pulleys and geared to said drums and also to said clamping-shafts, a belt-shipper rod, a weighted lever engaging with said shipper-rod and provided with arms, and a tappet-wheel gear engaging with said arms and driven by gearing communicating with the driving-shaft, substantially as described, whereby the belt-shipper is reciprocated and the rotation of said drums and their clamping-shafts simultaneously reversed.

7. The combination of the rotary clamp-shaft and the rotary drum embodying readily-detachable staves, substantially as described, whereby said drum may be practically closed by the use of all the staves or converted into a cage by removing more or less of them, and also whereby ready access to the interior of the cage or drum is afforded.

EDWARD B. LIGHT.

Witnesses:
HUGH McELHENY,
C. S. ROBBINS.